(12) United States Patent
Terahara et al.

(10) Patent No.: US 6,379,846 B1
(45) Date of Patent: *Apr. 30, 2002

(54) NON-AQUEOUS ELECTROLYTE AND LITHIUM SECONDARY BATTERY USING THE SAME

(75) Inventors: Atsushi Terahara; Taketsugu Yamamoto; Kenji Nakane, all of Tsukuba (JP)

(73) Assignee: Sumitomo Chemical Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/525,225

(22) Filed: Mar. 14, 2000

(30) Foreign Application Priority Data

| Mar. 16, 1999 | (JP) | ........................................... 11-070000 |
| Jul. 8, 1999 | (JP) | ........................................... 11-194351 |
| Nov. 18, 1999 | (JP) | ........................................... 11-328318 |

(51) Int. Cl.$^7$ ............................................. H01M 10/22
(52) U.S. Cl. ..................... 429/344; 429/32 B; 252/62.2
(58) Field of Search ........................... 429/231.95, 324, 429/325, 344, 188, 340; 252/62.2

(56) References Cited

U.S. PATENT DOCUMENTS 5,830,600 A * 11/1998 Narang et al. .............. 429/192
6,068,950 A * 5/2000 Gan et al. .............. 429/231.95

FOREIGN PATENT DOCUMENTS

| EP | 0 825 664 A1 | 2/1998 |
| EP | 0 918 364 A1 | 5/1999 |
| EP | 1 037 293 A1 * | 9/2000 | ............ H01M/6/16 |
| JP | 10 189 009 A | 7/1998 |

* cited by examiner

*Primary Examiner*—Gabrielle Brouillette
*Assistant Examiner*—Monique Wills
(74) *Attorney, Agent, or Firm*—Sughrue Mion, PLLC

(57) ABSTRACT

The present invention provides a non-aqueous electrolyte solution comprising a non-aqueous solvent and a lithium electrolyte, wherein the non-aqueous solvent is obtained by adding a phosphoric acid compound prepared by substituting at least one hydrogen atom in phosphoric acid or polyphosphoric acid with a group represented by the general formula [1]:

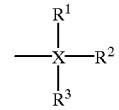

[1]

wherein, X represents Si, Ge or Sn atom, and each of $R^1$ to $R^3$ independently represents an alkyl group having 1 to 10 carbon atoms, an alkenyl group having 1 to 10 carbon atoms or an aryl group having 6 to 10 carbon atoms.

14 Claims, 1 Drawing Sheet

NON-AQUEOUS ELECTROLYTE AND LITHIUM SECONDARY BATTERY USING THE SAME

BACKGROUND OF THE INVENTION

1. Field of the Invention

The present invention relates to a non-aqueous electrolyte solution and a lithium secondary battery using the same.

2. Description of the Related Art

Conventionally, as an electrolyte solution for a lithium secondary battery having high energy density, there have been used electrolyte solutions prepared by dissolving a lithium electrolyte into carbonates having high withstand voltage such as dimethyl carbonate, ethylene carbonate and the like. However, since such carbonates are flammable liquid, various countermeasures for securing safety have been required. Further, the development of an electrolyte solution having higher safety has been eagerly desired recently wherein the development of a large-scale lithium secondary battery is in progress.

For improving safety of such an electrolyte solution, there is, for example, a suggestion in which the inflammability of an electrolyte is enhanced by using phosphates such as trimethyl phosphate, triethyl phosphate and the like as the non-aqueous solvent for the electrolyte solution (Japanese Patent Application Laid-Open (JP-A) No. 4-184870). However, since use of the above-described phosphates causes reduction in battery capacity, the development particularly of a large-scale lithium secondary battery is problematical.

SUMMARY OF THE INVENTION

The object of the present invention is to solve the above-described problems and to provide a non-aqueous electrolyte solution which has high energy density when used in a lithium secondary battery and further has excellent safety and a lithium secondary battery using this solution.

The present inventors have intensively studied for attaining the above-described object, and found that a non-aqueous electrolyte solution obtained by adding a phosphoric acid compound having a specific group is a non-aqueous electrolyte solution having high safety of battery and high energy density simultaneously since the solution has further excellent safety and small reduction in capacity when used in a battery, and have completed the present invention.

Namely, the present invention relates to (1) a non-aqueous electrolyte solution comprising a non-aqueous solvent and a lithium electrolyte, wherein the non-aqueous solvent is obtained by adding a phosphoric acid compound prepared by substituting at least one hydrogen atom in phosphoric acid or polyphosphoric acid with a group represented by the general formula [1]: (hereinafter, the phosphoric acid compound prepared by substituting at least one hydrogen atom in phosphoric acid with a group represented by the general formula [1] may be referred to as "phosphate compound", and the polyphosphoric acid compound prepared by substituting at least one hydrogen atom in polyphosphoric acid with a group represented by the general formula [1] may be referred to as "polyphosphate compound".)

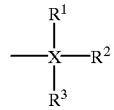

(wherein, X represents Si, Ge or Sn atom, and each of $R^1$ to $R^3$ independently represents an alkyl group having 1 to 10 carbon atoms, an alkenyl group having 2 to 10 carbon atoms or an aryl group having 6 to 10 carbon atoms.).

Also, the present invention relates to (2) a non-aqueous electrolyte solution comprising a non-aqueous solvent and a lithium electrolyte, wherein the non-aqueous solvent contains a phosphoric acid compound prepared by substituting at least one hydrogen atom in phosphoric acid or polyphosphoric acid with a group represented by the general formula [1].

Further, the present invention relates to (3) a lithium secondary battery comprising a cathode which can be doped or undoped with a lithium ion, an anode comprising a lithium metal or lithium alloy, or an anode which can be doped or undoped with a lithium ion, a non-aqueous electrolyte solution and a separator, wherein the non-aqueous electrolyte solution is a non-aqueous electrolyte solution according to (1) or (2).

Furthermore, the present invention relates to (4) the lithium secondary battery according to (3), wherein the cathode which can be doped or undoped with a lithium ion comprises a lithium composite oxide containing at least one of manganese, iron, cobalt or nickel.

Moreover, the present invention relate to (5) the lithium secondary battery according to (3), wherein the anode which can be doped or undoped with a lithium ion comprises at least one carbon material selected from the group consisting of natural graphite, artificial graphite and coke.

DETAILED DESCRIPTION OF THE PREFERRED EMBODIMENTS

Figure 1:
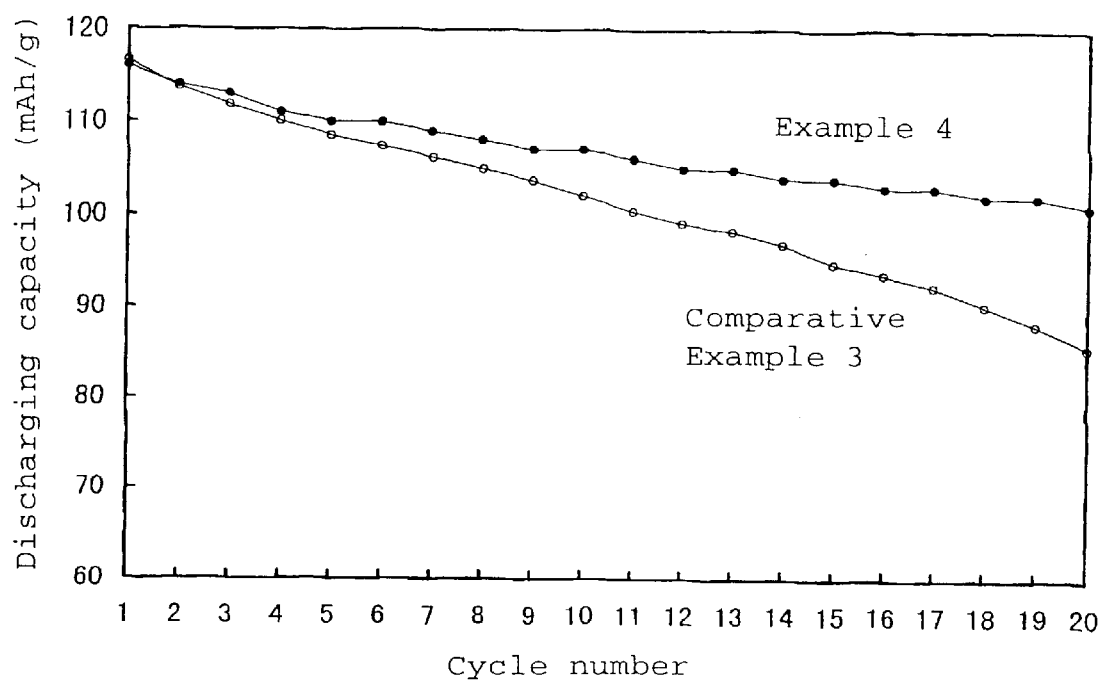
FIG. 1 illustrates cycle changes in discharging capacity in examples and comparative examples.

The present invention will be described in detail below.

The non-aqueous electrolyte solution (1) of the present invention comprises a non-aqueous solvent and a lithium electrolyte, and the non-aqueous solvent is obtained by adding a phosphoric acid compound prepared by substituting at least one hydrogen atom in phosphoric acid or polyphosphoric acid with a group represented by the general formula [1]:

The non-aqueous electrolyte solution (2) of the present invention comprises a non-aqueous solvent and a lithium electrolyte, and the non-aqueous solvent contains a phosphoric acid compound prepared by substituting at least one hydrogen atom in phosphoric acid or polyphosphoric acid with a group represented by the general formula [1].

In the general formula [1], X represents Si, Ge or Sn atom, and particularly Si atom is preferable since a lithium secondary battery having more excellent charging and discharging property is obtained by using Si atom.

In the general formula, each of $R^1$ to $R^3$ independently represents an alkyl group having 1 to 10 carbon atoms, an alkenyl group having 2 to 10 carbon atoms or an aryl group having 6 to 10 carbon atoms. $R^1$ to $R^3$ having carbon atoms of over 10 has a bad influence on the charging and discharging property of a lithium secondary battery using the electrolyte solution since the viscosity of an electrolyte solution becomes high. $R^1$ to $R^3$ preferably represent a methyl group, ethyl group or vinyl group.

A trimethylsilyl group in which all $R^1$ to $R^3$ represent a methylgroup in thegeneral formula [1] is further preferable since the viscosity of an electrolyte solution becomes low In the phosphoric acid compound in the present invention, a hydrogen atom which has not been substituted with a group represented by the general formula [1] may exert a bad influence on the charging and discharging property, therefore, the hydrogen atom is preferably substituted with an alkyl group, aryl group and the like. Also, the hydrogen atom may be substituted with an alkali metal atom.

Further, the phosphoric acid compound of the present invention is preferably a phosphate compound since then the viscosity is low, and phosphate compound represented by the following general formula [2] is further preferable.

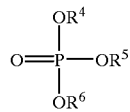

[2]

In the above-described general formula [2], each of $R^4$ to $R^6$ independently represents an alkyl group having 1 to 10 carbon atoms, a alkyl halide group having 1 to 10 carbon atoms, an alkenyl group having 2 to 10 carbon atoms, an aryl group having 6 to 10 carbon atoms, an aryl halide group having 6 to 10 carbon atoms or a group represented by the general formula [1]. An alkyl group, alkyl halide group, alkenyl group, aryl group or aryl halide group having carbon atoms of over 10 may have an influence on the charging and discharging property of a lithium secondary battery since the viscosity of an electrolyte solution becomes high. The phosphate compound of the present invention may be a cyclic phosphate in which two of $R^4$ to $R^6$ are bonded each other.

Examples of $R^4$ to $R^6$ include a methyl group, ethyl group, n-propyl group, iso-propyl group, n-butyl group, iso-butyl group, trichloroethyl group, trifluoroethyl group, pentafluoropropyl group, phenyl group, tolyl group and chlorophenyl group. Among them, a methyl group, ethyl group, n-propyl group and n-butyl group are preferable.

In the general formula [2], at least one of $R^4$ to $R^6$ is a group represented by the above-described general formula [1].

In the general formula [2], it is more preferable that all three groups are substituted by a group represented by the general formula [1] since higher number of the group represented by the general formula [1] lower the reduction in the capacity of a battery.

Silyl polyphosphate containing Si atom which is a polyphosphate compound used in the present invention can be produced, for example, by reacting phosphorus pentaexide with disiloxanes. Specifically, trimethylsilyl polyphosphate, triethylsily polyphosphate, vinyldimethyisilyl polyphospohate and the like are exemplified.

As the phosphate compound containing Si atom used in the present invention, those having 3, 2 or 1 group represented by the general formula [1] are used.

Specific examples of the compound having three groups [1] include tris(trimethylsilyl) phosphate, tris(triethylsilyl) phosphate, tris(vinyldimethylsilyl) phosphate and the like, and tris(trimethylsilyl) phosphate is preferable.

Specific examples of the compound having two groups [1] include bis(trimethylsilyl ) methyl phosphate, bis (trimethylsilyl) ethyl phosphate, bis(trimethylsilyl) n-propyl phosphate, bis (trimethylsilyl) i-propyl phosphate, bis (trimethylsilyl) n-butyl phosphate, bis (trimethylsilyl) trichloroethyl phosphate, bis(trimethylsilyl) trifluoroethyl phosphate, bis(trimethylsilyl) pentafluoropropyl phosphate, bis(trimethylsilyl) phenyl phosphate and the like.

Specific examples of the compound having one group [1] include dimethyl trimethylsilyl phosphate, diethyl trimethylsilyl phosphate, di-n-propyl trimethylsilyl phosphate, di-i-propyl trimethylsilyl phosphate, di-n-butyl trimethylsilyl phosphate, bis(trichloroethyl) trimethylsilyl phosphate, bis (trifluoroethyl) trimethylsilyl phosphate, bis (pentafluoropropyl) trimethylsilyl phosphate, diphenyl trimethylsilyl phosphate and the like.

Specific examples containing Ge or Sn atom include dimethyl trimethylgermyl phosphate, diethyl trimethylgermyl phosphate, dipropyl trimethylgermyl phosphate, di-n-propyl trimethylgermyl phosphate, di-n-butyl trimethylgermyl phosphate, dimethyl trimethylstanyl phosphate, diethyl trimethylstanyl phosphate, dipropyl trimethylstanyl phosphate, di-n-propyl trimethylstanyl phosphate, di-n-butyl trimethylstanyl phosphate and the like.

Examples of compounds having two or more of Si, Ge or Sn atom include bis(trimethylsilyl) trimethylgermyl phosphate, bis(trimethylsilyl) tributylgermyl phosphate, bis (trimethylsilyl) trimethylstanyl phosphate, bis (trimethylsilyl) tributylstanyl phosphate and the like.

When a phosphoric acid compound is used alone as a non-aqueous solvent in the non-aqueous electrolyte solution of the present invention, electric conductivity may become relatively low since the viscosity of the non-aqueous electrolyte solution containing a lithium electrolyte dissolved is relatively high. Therefore, it is preferable to use a mixed solvent of the phosphoric acid compound with other solvent as the non-aqueous solvent for improving practical use of the non-aqueous electrolyte solution of the present invention.

As the non-aqueous solvent other than the phosphoric acid compound used in the non-aqueous electrolyte solution of the present invention, there can be used those conventionally known as a non-aqueous solvent used in a non-aqueous electrolyte solution for a lithium secondary battery, and it is preferable to contain any one or more of dimethyl carbonate, ethyl methyl carbonate, diethyl carbonate, methyl propyl carbonate, ethyl propyl carbonate, methyl butyl carbonate, ethylene carbonate, propylene carbonate, butylene carbonate and vinylene carbonate, since high with stand voltage of an electrolyte solutions obtained. Herein, the term propyl indicates n-propyl or isopropyl, the term butyl indicates n-butyl, isobutyl or t-butyl, and the term butylene indicates 1,2-butylene or 2,3-butylene.

Particularly, solvents prepared by mixing any one or more of dimethyl carbonate, ethyl methyl carbonate, diethyl carbonate, ethylene carbonate, propylene carbonate and vinylene carbonate are preferable, and solvents prepared by mixing any one or more of dimethyl carbonate, ethyl methyl carbonate, ethylene carbonate and vinylene carbonate are further preferable.

In the non-aqueous electrolyte solution of the present invention, the amount of a phosphoric acid compound is preferably from 0.01 to 40 vol %, further preferably from 0.1 to 20 vol % based on 100 vol % of the whole non-aqueous electrolyte solution. When this amount is less than 0.01 vol %, effect of improving safety may be small, and when over 40 vol %, the electric conductivity of an electrolyte may decrease.

It has been found that a phosphoric acid compound used in the present invention, when added to an electrolyte solution, can suppress reduction in battery capacity as compared with a phosphate compound conventionally used in general, for example, trimethyl phosphate and triethyl phosphate.

Further, it has been found, as a result of flammability test of a non-aqueous electrolyte solution containing the phosphoric acid compound added, that the inflammability of the electrolyte solution is improved as compared with the case in which the compound is not added. Also, it has been found that the phosphoric acid compound contributes to improvement of safety of a battery even in battery tests such as heating, nailing, crushing and the like.

Therefore, by using the non-aqueous electrolyte solution of the present invention, a battery having high energy density and safety can be produced As the lithium electrolyte in the non-aqueous electrolyte solution of the present invention, any of those conventionally known can be used. Specific examples thereof include $LiBF_4$, $LiPF_6$, $LiAsF_6$, $LiClO_4$, $LiCF_3SO_3$, $LiN(SO_2CF_3)_2$ and $LiC(SO_2CF_3)_3$. These lithium electrolytes may be respectively used alone or may be used in combination thereof if required.

In the non-aqueous electrolyte solution of the present invention, the concentration of a lithium electrolyte is preferably from 0.1 to 2.0 mol/liter, and due to high ion conductivity, more preferably from 0.3 to 1.5 mol/liter.

The lithium secondary battery of the present invention comprises a cathode which can be doped or undoped with a lithium ion, an anode comprising a lithium metal or lithium alloy, or an anode which can be doped or undoped with a lithium ion, a non-aqueous electrolyte solution and a separator, and is characterized in that the non-aqueous electrolyte solution is a non-aqueous electrolyte solution according to (1) or (2) of the present invention.

In the lithium secondary battery of the present invention, it is preferable that the cathode comprises a lithium composite oxide containing at least one of manganese, iron, cobalt and nickel.

In the lithium secondary battery of the present invention, high charging voltage and high energy density of a battery can be accomplished by using a lithium composite oxide containing at least one of the above-described transition metals as an active material in the cathode.

It is further preferable that the above-described lithium composite oxide contains manganese and has a spinel type crystal structure, since the cycle property at high temperature can be improved by combination with the nonaqueous electrolyte solution of the above-described invention (1) or (2).

As the lithium composite oxide containing manganese and having a spinel type crystal structure, there are exemplified lithium manganese spinel and substituted compounds thereof represented by $Li_x(Mn_{2-y}M_y)O_4$ ($0<x\leq1$, $0\leq y<2$, and M represents one or more elements selected from the group consisting of Li, Mg, B, Al, Ga, Si, Ti, V, Cr, Fe, Co, Ni, Cu, Ag and Zn.).

For obtaining the cathode in the lithium secondary battery of the present invention, a method that the above-described lithium composite oxide powder, auxiliary electric conductive powder, binder and the like are uniformly mixed before pressure-molding, or are made into a paste using a solvent and the like, and the paste is applied and dried on a current collector before being pressed to obtain a cathode fixed on the current collector sheet, is exemplified.

The auxiliary electric conductive powder used in the cathode may advantageously be one which has electric conductive effect, resistance to a non-aqueous electrolyte solution used and resistance to electrochemical reactions in the cathode, and there may be exemplified carbon black, cokes powder, electric conductive polymer and the like.

The amount of the auxiliary electric conductive agent is preferably from 1 to 20 parts by weight based on 100 parts by weight of a cathode active material powder used.

In the lithium secondary battery of the present invention, at least one carbon material selected from the group consisting of natural graphite, artificial graphite and coke is preferably contained as an active material in the anode owing to excellent charging and discharging cycle property of such materials. As an anode active material, lithium metal or lithium alloy can be used.

The binder used in the above-described cathode and anode may advantageously be one which has binding effect, resistance to a non-aqueous electrolyte solution used and resistance to electrochemical reactions in the cathode or anode. There may be exemplified polytetrafluoroethylene, poly(vinylidene fluoride), polyethylene, polypropylene, styrene-butadiene rubber, acrylonitrile-butadiene rubber, cellulose and the like.

The amount of the binder is preferably from 1 to 20 parts by weight based on 100 parts by weight of active material used. The current collector used in the above-described cathode or anode may advantageously be one which has resistance to a non-aqueous electrolyte solution used and resistance to electrochemical reactions in the cathode or anode, and there may be exemplified nickel, titanium, stainless steel, aluminum and the like.

The thickness of the current collector is preferably as thin as possible providing strength is maintained and preferably from about 5 to 100 $\mu$m since then volume energy density of a battery increases.

As the current collector in the cathode, an aluminum foil is preferable since it is processed easily into a thin film and is cheap. As the current collector in the anode, a copper foil is preferable since it does not easily form an alloy with lithium and it is processed easily into a thin film.

In the non-aqueous electrolyte solution lithium secondary battery of the present invention, the separator may advantageously be one which has insulation property by preventing contact between two electrodes, and keeps the non-aqueous electrolyte solution, has such a function that a lithium ion can permeate, and has resistance to a non-aqueous electrolyte solution used and resistance to electrochemical reactions in the cathode and anode, and there may be exemplified fluororesins, olefin-based resins such as polyethylene, polypropylene and the like, non-woven fabric and woven fabric such as nylon, aromatic polyamide and the like.

The thickness of the separator is advantageously as thin as possible providing mechanical strength is maintained due to increase in volume energy density of a battery and lowered inner resistance, and preferably from about 1 to 200 $\mu$m.

In the non-aqueous electrolyte solution lithium secondary battery of the present invention, the load property and the load property after storage are preferable when a sum of the water content introduced into the battery from a separator and sheet electrodes and the water content of non-aqueous electrolyte solution poured into the battery is from 30 to 800 weight ppm, more preferably from 30 to 400 weight ppm based on the amount of the non-aqueous electrolyte solution poured into the battery.

In the non-aqueous electrolyte solution lithium secondary battery of the present invention, the load property and the load property after storage are preferable when a sum of the water content introduced into the battery from a separator, sheet electrodes and resin parts and the water content of non-aqueous electrolyte solution poured into the battery (hereinafter, referred to as "a sum of the water content introduced into the battery") is from 30 to 800 weight ppm, more preferably from 30 to 400 weight ppm based on the amount of the non-aqueous electrolyte solution poured into the battery.

The resin parts do not include a substance made of resins contained in a separator and sheet electrodes.

The water content can be measured with a Karl Fischer's water content meter.

The form of the lithium secondary battery of the present invention is not particularly restricted, and may be any of paper-sheet form, coin-like form, cylindrical form, rectangular parallelepiped form and the like.

EXAMPLES

The following examples illustrate the present invention, but do not limit the scope of the present invention.

(I) Specification of Lithium Secondary Battery used in Test

1: Production of Sheet Form Cathode 1 wt % of acetylene black and 5 wt % of scale-shaped artificial graphite were mixed into 89 wt % of a lithitaed cobalt dioxide powder, and to this was added, as a binder, poly(vinylidene fluoride) in N-methylpyrrolidone as a solvent in an amount of 5 wt %, and the mixture was kneaded sufficiently to obtain a paste. This paste was applied on an aluminum foil having a thickness of 20 $\mu$m which is a current collector, then, dried and roll-pressed, and punched in the form of a disk having a diameter of 2 cm to obtain a sheet-shaped cathode.

2: Production of Sheet Form Anode

To 95 wt % of a graphite powder was added, as a binder, carboxymethyl cellulose (Na salt) dissolved in water in an amount of 5 wt %, and the mixture was kneaded sufficiently to obtain a paste. This paste was applied on a copper foil having a thickness of 12 $\mu$m which is a current collector, then, dried and roll-pressed, and punched in the form of a disk having a diameter of 2 cm to obtain a sheet-shaped anode.

3: Production of Flat Plate Battery

The sheet-shaped cathode and sheet-shaped anode obtained as described above were allowed to face each other via a porous polypropylene separator, put in a stainless vessel, and an electrolyte solution was poured and a flat plate battery was produced.

Example 1

$LiPF_6$ was dissolved into mixed solvents of ethylene carbonate, dimethyl carbonate and ethyl methyl carbonate at volume ratios of 30:35:35, 30:10:60, 15:20:65 and 15:30:55 so that the concentration of $LiPF_6$ was 1 mol/liter, to them were added 5 parts by volume of tris(trimethylsilyl) phosphate to give electrolyte solutions E1, E2, E3 and E4. And batteries A1, A2, A3 and A4 were made using these electrolyte solutions E1, E2, E3 and E4, respectively.

Example 2

$LiPF_6$ was dissolved into a mixed solvent of ethylene carbonate, vinylene carbonate, dimethyl carbonate and ethyl methyl carbonate at a volume ratio of 12:3:20: 65 so that the concentration of LiPF6 was 1 mol/liter, to this was added 5 parts by volume of tris(trimethylsilyl) phosphate to give an electrolyte solution E5. And a battery A5 was made using the electrolyte solution E5.

Example 3

$LiPF_6$ was dissolved into mixed solvents of ethylene carbonate, dimethyl carbonate and ethyl methyl carbonate at a volume ratio of 15:20:65 so that the concentration of $LiPF_6$ was 1 mol/liter, to them were added 5 parts by volume of methyl bis(trimethylsilyl) phosphate, dimethyl trimethylsilyl phosphate and diethyl trimethylsilyl phosphate to give electrolyte solutions E6, E7 and E8, respectively. And batteries A6, A7 and A8 were made using these electrolyte solutions E6, E7 and E8, respectively.

Comparative Example 1

$LiPF_6$ was dissolved into a mixed solvent of ethylene carbonate, dimethyl carbonate and ethyl methyl carbonate at a volume ratio of 15:20:65 so that the concentration of LiPF6 was 1 mol/liter, to give an electrolyte solution ER1. And a battery R1 was made using the electrolyte solution ER1.

Comparative Example 2

$LiPF_6$ was dissolved into mixed solvents of ethylene carbonate, dimethyl carbonate and ethyl methyl carbonate at a volume ratio of 15:20:65 so that the concentration of $LiPF_6$ was 1 mol/liter, to them were added 5 parts by volume of trimethyl phosphate, triethyl phosphate, trixylenyl phosphate, tris(tribromoneopentyl) phosphate, aromatic condensed phosphate (known substance, No. 4-1640), and halogen-containing condensed phosphate (known substance, No. 2-1965) to give electrolyte solutions ER2, ER3, ER4, ER5, ER6 and ER7, respectively. And batteries R2, R3, R4, R5, R6 and R7 were made using these electrolyte solutions ER2, ER3, ER4, ER5, ER6 and ER7, respectively.

1. Burning Test

Into the resulted electrolyte solution was immersed manila paper of a width of 20 mm and a length of 210 mm for 1 minute, and suspended straight for 30 seconds to remove excess electrolyte solution, and a test piece thus impregnated with the electrolyte was supported on supporting needles placed at an interval of 25 mm on a sample table and was fixed horizontally with the needles piercing into the test piece. One end of the test piece was lighted with a lighter and the length of burnt portion of the sample piece was measured.

In the case of the electrolyte ER1 containing no substituted phosphate compound, flame extended from one end of the test piece of 210 mm to another end thereof in 5 seconds, while, in the case of the electrolyte solution E1 of the present invention, flame extended 160 mm in 6 seconds, then, was extinguished. On the other hand, also in the case of the electrolyte ER2 containing trimethyl phosphate, a phosphate compound conventionally suggested, flame extended 160 mm in 6 seconds, then, was extinguished.

2. Discharging Test

The capacity of a flat plate battery in the discharging test is shown in Table 1.

The capacity of a flat plate battery is a capacity when constant current discharge is conducted at 2 mA and 3 V cut-off after constant current and voltage charging at 4 mA, 4.2 V and 4 hours.

TABLE 1

|  | Electrolyte solution | Battery | Battery capacity [mAh] |
|---|---|---|---|
| Example | E1 | A1 | 8.25 |
|  | E2 | A2 | 8.20 |
|  | E3 | A3 | 8.31 |
|  | E4 | A4 | 8.29 |
|  | E5 | A5 | 8.27 |
|  | E6 | A6 | 8.31 |
|  | E7 | A7 | 8.30 |
|  | E8 | A8 | 8.27 |
| Comparative | ER1 | R1 | 8.31 |
| Example | ER2 | R2 | 7.49 |
|  | ER3 | R3 | 7.23 |
|  | ER4 | R4 | 6.59 |
|  | ER5 | R5 | 0.00 |
|  | ER6 | R6 | 6.71 |
|  | ER7 | R7 | 6.85 |

As is known from the above-described results, the electrolyte solution E1 of the present invention has excellent inflammability as compared with the electrolyte solution ER1 containing no phosphate compound of the present invention in Comparative Example.

Further, as compared with the flat plate battery (R1) containing no phosphate compound, the batteries R2 to R7 containing phosphate compounds conventionally suggested manifest large reduction in battery capacity, while, the batteries A1 to A8 of the present invention show almost no reduction in battery capacity.

Example 4

This example illustrates further in detail that cycle property at high temperature can be improved by combining a cathode comprising a lithium composite oxide containing manganese and having a spinel type crystal structure with the non-aqueous electrolyte solution in the above-described invention (1) or (2). Productions of an electrode and a flat plate battery for a charging and discharging test are conducted according to the following methods.

To a mixture of 86 wt % of a lithium manganese spinel ($LiMn_2O_4$) powder with 10 wt % of acetylene black was added, as a binder, 4% by weight of poly(vinylidene fluoride) in N-methylpyrrolidone as a solvent, and the mixture was kneaded sufficiently to obtain a paste. This paste was applied on a current collector, #100 stainless mesh of 1.5 cm ×2 cm, then, dried in vacuo at 150° C. for 8 hours to obtain an electrode (cathode).

The electrode obtained as described above was allowed to face a metal lithium which is a counter electrode (anode) via a porous polypropylene separator, and put in a stainless vessel. Then, an electrolyte solution prepared by adding 2.5 parts by volume of tris(trimethylsilyl) phosphate to an electrolyte solution obtained by dissolving $LiPF_6$ into a mixed solvent of ethylene carbonate and ethyl methyl carbonate at a volume ratio of 50:50 so that the concentration of LiPF6 was 1 mol/liter, was poured into the stainless vessel to produce a flat plate battery.

Subsequently, the flat plate battery was placed in a thermostat, kept at 60° C., and a charging and discharging test was conducted according to the following conditions.

Charging: charging at constant current and voltage of 1.2 mA and 4.3 V for 8 hours Discharging: discharging at constant current of 1.2 mA and 3.5 V cut off Changes in discharging capacity until 20-th cycle are shown in FIG. 1. In spite of such a high temperature as 60° C., discharging capacities at 10-th and 20-th cycles were 107 and 101 mAh/g, respectively, and these results mean excellent cycle property.

Comparative Example 3

A flat plate battery was produced in the same manner as in Example 4 except that tris(trimethylsilyl)phosphate was not added, and charging and discharging test at 60° C. was conducted.

Changes in discharging capacity until 20-th cycle are shown in FIG. 1. Discharging capacities at 10-th and 20-th cycles were 102 and 86 mAh/g, respectively, and these results show steep reduction in the capacity.

Example 5

Next, this example illustrates further in detail that a battery particularly having excellent load property and load property after storage is obtained when the sum of water content introduced into the battery in constructing the battery is from 30 to 800 weight ppm based on the amount of an electrolyte solution poured into the battery. Production of a cylindrical battery and measurement of water content were conducted according to the following methods.

A cathode sheet and an anode sheet were produced in the same working processes as in the above-described "1: Production of sheet form cathode" and "2: Production of sheet form anode" including roll press, except that 50 wt % of the carboxymethylcellulose (Na salt) component was substituted by SBR latex in the binder composition of the anode, and the cathode was cut into a width of 52 mm and a length of 450 mm and the anode was cut into a width of 54 mm and a length of 520 mm. The end parts of these sheet electrodes carried non-coated parts having a length of 15 mm provided, and an aluminum ribbon was welded to the non-coated part at the end part of the cathode sheet electrode and a nickel ribbon was welded to the non-coated part at the end part of the anode sheet electrode, each as a lead body for emergence of current. The thickness of the cathode sheet was about 170 μm and the thickness of the anode sheet was about 150 μm.

These sheets were dried in vacuo, then, subjected to the following procedure in dry atmosphere at a dew point below −30° C. The anode and the cathode were wound so that the anode constituted the inner layer and the cathode constituted the outer layer while inserting a separator comprising a polyethylene fine porous film having a width of 56 mm between the electrodes for insulation, by using a winding jig having a winding core diameter of 4 mm, and a separator was wound onto the outermost circumference and fixed with an adhesive tape. The cathode was provided with a lead body at the winding initiation side and the anode was provided with a lead body at the winding terminating side (outermost circumference side of the anode), the cathode lead body and the anode lead body were situated at opposite sides respectively of the wound body.

Then, (in some cases, after drying of the wound body in vacuo at given temperature), a disk form insulation sheet having a hole at the center was inserted between the wound body and the anode lead body, and this wound body was inserted into a stainless cylindrical vessel having an outer diameter of 19 mm so that the anode lead body touched on the vessel bottom, then, the anode lead body was spot-welded to the vessel bottom. Then, at given position near the vessel opening part, a sealing gasket in the form of a ring was engaged to extruded parts formed on the circumference extruding to the inner side, the cathode lead body was welded to the cathode terminal, then, pouring of the electrolyte solution was conduced in a few operations divided. Then, the cathode terminal was engaged to the gasket, and the vessel opening part was crimped for sealing to complete a battery having a diameter of 19 mm and a height of 65 mm.

The article before pouring of the electrolyte solution in the above-described cylindrical battery production process was decomposed and then samples of a separator, sheet electrodes and resin parts (a disk form insulation sheet and a sealing gasket in this example) for measuring water content were taken out.

For measuring water content, the separators and resin parts were heated at 100° C. and sheet electrodes were heated at 300°0 C., and vaporized water was introduced into a Karl Fischer's water content meter. The electrolyte solution was poured in given amount into the water content meter. The total amount of water contents obtained by the above-described measurements results was recognized as a sum of water content contained, and the ratio thereof based on the amount of the electrolyte solution poured into the battery was calculated to give water content ratio.

Electrolyte solutions E3 and E5 were used in samples having different water contents contained depending on drying times of the sheet electrodes and wound body, and batteries A9 to A22 were constructed. Results of high load discharging at 3 A was conduced on these batteries, and results of the same test after storage at 60° C. for 20 days are shown in Table 2.

Comparative Example 4

Batteries R8 to R14 were constructed in the same manner as in Example 5 except that ER1 was used as an electrolyte solution. Results of high load discharging at 3 A on these batteries, and results of the same test after storage at 60° C. for 20 days are shown in Table 2.

TABLE 2

| | Vacuum drying time | Water content ratio ppm | Electro-lyte solution | 3A discharge capacity (initial) mAh | 3A discharge capacity (after storage) mAh |
|---|---|---|---|---|---|
| A9 | Sheet, 1 hour only | 1400 | E3 | 1445 | 1242 |
| A10 | Sheet, 2 hours only | 1100 | E3 | 1475 | 1269 |
| A11 | Sheet, 5 hours only | 800 | E3 | 1508 | 1327 |
| A12 | Sheet, 10 hours only | 500 | E3 | 1563 | 1391 |
| A13 | Sheet, 20 hours only | 300 | E3 | 1596 | 1436 |
| A14 | Sheet, 30 hours and wound body, 5 hours | 100 | E3 | 1599 | 1439 |
| A15 | Sheet, 100 hours and wound body, 10 hours | 30 | E3 | 1602 | 1442 |
| A16 | Sheet, 1 hour only | 1400 | E5 | 1438 | 1236 |
| A17 | Sheet, 2 hours only | 1100 | E5 | 1463 | 1258 |
| A18 | Sheet, 5 hours only | 800 | E5 | 1489 | 1310 |
| A18 | Sheet, 10 hours only | 500 | E5 | 1549 | 1378 |
| A20 | Sheet, 20 hours only | 300 | E5 | 1587 | 1428 |
| A21 | Sheet, 30 hours and wound body, 5 hours | 100 | E5 | 1598 | 1438 |
| A22 | Sheet, 100 hours and wound body, 10 hours | 30 | E5 | 1603 | 1442 |
| R8 | Sheet, 1 hour only | 1400 | ER1 | 1427 | 1213 |
| R9 | Sheet, 2 hours only | 1100 | ER1 | 1440 | 1229 |
| R10 | Sheet, 5 hours only | 800 | ER1 | 1472 | 1251 |
| R11 | Sheet, 10 hours only | 500 | ER1 | 1490 | 1281 |
| R12 | Sheet, 20 hours only | 300 | ER1 | 1511 | 1295 |
| R13 | Sheet, 30 hours and wound body, 5 hours | 100 | ER1 | 1513 | 1299 |
| R14 | Sheet, 100 hours and wound body, 10 hours | 30 | ER1 | 1513 | 1305 |

It is recognized from the above-described results that A9 to A22 using electrolyte solutions E3, E5 of the present invention show large improvement in discharging capacity at high load, namely in load property as compared with comparative examples R8 to R14 having the same water contents. Also regarding property after storage, all batteries A9 to A22 of the present invention show improvement as compared with comparative examples R8 to R14 having the same water contents. When the water content is 800 weight ppm or less in batteries of the examples of the present invention, reduction in capacity after storage is small, and when the water content is 400 weight ppm or less, the capacity property is further preferable. However, when the water content is 100 weight ppm or less, capacity improvement effect by further reducing water content becomes small.

The non-aqueous electrolyte solution containing a phosphate compound or polyphosphate compound of the present invention has high inflammability, and a lithium secondary battery using this solution manifests small reduction in battery capacity, therefore, a non-aqueous electrolyte solution having high energy density and excellent safety and a lithium secondary battery using this solution can be provided according to the present invention.

What is claimed is:

1. A non-aqueous electrolyte solution for a secondary battery comprising a non-aqueous solvent and a lithium electrolyte, wherein the non-aqueous solvent is obtained by adding a phosphoric acid compound prepared by substituting at least one hydrogen atom in phosphoric acid or polyphosphoric acid with a group represented by the general formula [1]:

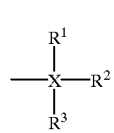

[1]

wherein, X represents Si, Ge or Sn atom, and each of $R^1$ to $R^3$ independently represents an alkyl group having 1 to 10 carbon atoms, an alkenyl group having 2 to 10 carbon atoms or an aryl group having 6 to 10 carbon atoms.

2. A non-aqueous electrolyte solution comprising a non-aqueous solvent and a lithium electrolyte, wherein the non-aqueous solvent contains a phosphoric acid compound prepared by substituting at least one hydrogen atom in phosphoric acid or polyphosphoric acid with a group represented by the general formula [1] according to claim 1.

3. The non-aqueous electrolyte solution according to claim 1 or 2, wherein X represents Si atom in the general formula [1].

4. The non-aqueous electrolyte solution according to claim 1 or 2, wherein the group represented by the general formula [1] is a trimethylsilyl group.

5. The non-aqueous electrolyte solution according to claim 1 or 2, wherein the phosphoric acid compound is a phosphate compound represented by the general formula [2]:

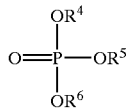

[2]

wherein, each of $R^4$ to $R^6$ independently represents an alkyl group having 1 to 10 carbon atoms, a alkyl halide group having 1 to 10 carbon atoms, an alkenyl group having 2 to 10 carbon atoms, an aryl group having 6 to 10 carbon atoms, an aryl halide group having 6 to 10 carbon atoms or a group represented by the general formula [1], and at least one of $R^4$ to $R^6$ is a group represented by the general formula [1].

6. The non-aqueous electrolyte solution according to claim 5, wherein the phosphate compound represented by the general formula [2] is tris(trimethylsilyl) phosphate.

7. The non-aqueous electrolyte solution according to claim 1 or 2, wherein the non-aqueous solvent comprises any one or more of dimethyl carbonate, ethyl methyl carbonate, diethyl carbonate, methyl propyl carbonate, ethyl propyl carbonate, methyl butyl carbonate, ethylene carbonate, propylene carbonate, butylene carbonate and vinylene carbonate.

8. The non-aqueous electrolyte solution according to claim 1 or 2, wherein the amount of the phosphoric acid compound is from 0.01 to 40 vol % based on 100 vol % of the whole non-aqueous electrolyte solution.

9. A lithium secondary battery comprising a cathode which can be doped or undoped with a lithium ion, an anode comprising a lithium metal or lithium alloy, or an anode which can be doped or undoped with a lithium ion, a non-aqueous electrolyte solution and a separator, wherein the non-aqueous electrolyte solution is a non-aqueous electrolyte solution according to claim 1 or 2.

10. The lithium secondary battery according to claim 9, wherein the cathode which can be doped or undoped with a lithium ion comprises a lithium composite oxide containing at least one of manganese, iron, cobalt or nickel.

11. The lithium secondary battery according to claim 10, wherein the lithium composite oxide contains manganese and has a spinel type crystal structure.

12. The lithium secondary battery according to claim 9, wherein the anode which can be doped or de-doped with a lithium ion comprises at least one carbon material selected from the group consisting of natural graphite, artificial graphite and coke.

13. The lithium secondary battery according to claim 9, wherein a sum of the water content introduced into the battery from a separator and sheet electrodes and the water content of non-aqueous electrolyte solution poured into the battery is from 30 to 800 weight ppm based on the amount of the non-aqueous electrolyte solution poured into the battery.

14. The lithium secondary battery according to claim 9, wherein a sum of the water content introduced into the battery from a separator, sheet electrodes and resin Parts and the water content of non-aqueous electrolyte solution poured into the battery is from 30 to 800 weight ppm based on the amount of the non-aqueous electrolyte solution poured into the battery.

* * * * *